(12) United States Patent
Cheong et al.

(10) Patent No.: US 8,331,473 B2
(45) Date of Patent: Dec. 11, 2012

(54) MIMO ANTENNA RECEIVING APPARATUS AND RECEIVING METHOD

(75) Inventors: Minho Cheong, Daejon (KR); Yu-Ro Lee, Daejon (KR); Jong-Ee Oh, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 689 days.

(21) Appl. No.: 12/238,082

(22) Filed: Sep. 25, 2008

(65) Prior Publication Data

US 2009/0154587 A1 Jun. 18, 2009

(30) Foreign Application Priority Data

Dec. 13, 2007 (KR) ........................ 10-2007-0129972

(51) Int. Cl.
*H04B 7/02* (2006.01)
(52) U.S. Cl. ........ 375/267; 375/347; 375/349; 375/340; 370/343; 370/437; 370/329
(58) Field of Classification Search .................. 375/267, 375/340, 347, 349, 141, 260; 370/201, 335, 370/343, 437, 329
See application file for complete search history.

(56) References Cited

U.S. PATENT DOCUMENTS

| | | | | |
|---|---|---|---|---|
| 6,795,424 B1* | 9/2004 | Kapoor et al. | ................. | 370/343 |
| 7,676,007 B1* | 3/2010 | Choi et al. | ..................... | 375/347 |
| 7,929,625 B2* | 4/2011 | Wilhelmsson et al. | ....... | 375/260 |
| 2002/0027985 A1* | 3/2002 | Rashid-Farrokhi | ........... | 379/417 |
| 2005/0237971 A1* | 10/2005 | Skraparlis | ..................... | 370/329 |
| 2006/0268963 A1* | 11/2006 | Yoshida | ......................... | 375/148 |
| 2007/0058757 A1* | 3/2007 | Kusume | ......................... | 375/340 |
| 2007/0140363 A1 | 6/2007 | Horng et al. | | |
| 2007/0206626 A1* | 9/2007 | Lee et al. | ....................... | 370/437 |
| 2007/0211813 A1* | 9/2007 | Talwar et al. | ................. | 375/267 |

FOREIGN PATENT DOCUMENTS

KR 10-2005-0065499 A 6/2005
KR 10-2007-0094442 A 9/2007

OTHER PUBLICATIONS

Jack H. Winters, "Optimum Combining in Digital Mobile Radio with Cochannel Interference", IEEE Journal on Selected Areas in Communications, Jul. 1984, pp. 528-539, vol. SAC-2, No. 4.
Kai-Kit Wong et al., "Adaptive Antennas at the Mobile and Base Stations in an OFDM/TDMA System", IEEE Transactions on Communications, Jan. 2001, pp. 195-206, vol. 49, No. 1.
Joun Sup Park et al., "Cochannel Interference Tolerant MIMO Antenna Structure for High Speed Wireless Communication", The 18th Joint Conference on Communications and Information, pp. 1-5, Apr. 24, 2008.
Jack H. Winters, "Optimum Combining in Digital Mobile Radio with Cochannel Interference", IEEE Transactions on Vehicular Technology, pp. 144-155, vol. VT-33, No. 3, Aug. 1984.

* cited by examiner

*Primary Examiner* — Eva Puente
(74) *Attorney, Agent, or Firm* — Kile Park Goekjian Reed & McManus PLLC (57) ABSTRACT

Provided is a reception apparatus and method of a Multiple Input Multiple Output (MIMO) system that receives a plurality of different data streams in a multiple cell environment. The reception apparatus for receiving a plurality of different data streams in a multiple input multiple output (MIMO) antenna system includes a data stream detector for detecting each data stream by removing interference between the different data streams while maintaining channel information; and a cochannel interference (CCI) remover for removing cochannel interference from each data stream detected in the data stream detector. The present invention can remove cochannel interference and increase channel capacity to thereby acquire both diversity gain and multiplexing gain.

14 Claims, 9 Drawing Sheets

MIMO ANTENNA RECEIVING APPARATUS AND RECEIVING METHOD

CROSS-REFERENCE(S) TO RELATED APPLICATIONS

The present invention claims priority of Korean Patent Application No. 10-2007-0129972, filed on Dec. 13, 2007, which is incorporated herein by reference.

BACKGROUND OF THE INVENTION

1. Field of the Invention

The present invention relates to a reception apparatus and method of a Multiple Input Multiple Output (MIMO) system that receives a plurality of different data streams in a multiple cell environment.

This work was supported by the IT R&D program of MIC/IITA [2006-S-002-02, "IMT-Advanced Radio Transmission Technology with Low Mobility"].

2. Description of Related Art

Optimum Combining (OC) technology is used in designing a wireless communication system in a multi-cell environment to remove cochannel interference and thereby prevent deterioration in performance caused by the cochannel interference (CCI). As the field of wireless communication services extends from conventional low-speed voice communication to high-speed multimedia communications, such technologies as Singular Value Decomposition (SVD) and Vertical Bell Lab Space Time (V-BLAST) are used to increase. data transmission rate.

Optimum Combining technology removes interference signals in a cellular-based multiple access system employing Multiple Input Multiple Output (MIMO) antennas. The technology prevents performance deterioration by removing interference between channels, i.e., cochannel interference. Also, the technology can maximize signal-to-noise ratio (SNR) by reducing influence of fading.

Optimum combining technology is what Maximal Ratio Combining (MRC) technology is extended into an interference-existing environment. Signals are regarded as colored noise added thereto in the environment where there is interference. The interference signal can be removed by using a whitening filter to thereby turn the colored noise into white noise and combining outputs of the whitening filter through Maximal Ratio Combining. Maximal ratio combining is a technology for maximizing an output signal-to-noise ratio in an MIMO antenna system, and it independently gives a weight to each data stream received in each antenna of an MIMO antenna reception apparatus. Generally, a weight maximizing the signal-to-noise ratio of data streams is selected. Data streams are combined according to the given weight to thereby remove cochannel interference.

Also, in order to remove cochannel interference and decrease the influence of fading, the MIMO antenna system suggests a Smart Base and Smart Mobile (SBM) antenna structure. Multiple antennas of a transmission apparatus are given with directivity based on a beamforming vector, individually, and transmit data streams in a desired direction. Herein, each data stream transmitted through the antennas of the transmission apparatus functions as interference onto data streams transmitted through the other antennas, the reception apparatus removes the cochannel interference and maximizes signal-to-interference plus noise ratio (SINR) by using an Optimum Combining onto the data streams received through multiple antennas.

This method increases signal reception performance and acquires diversity gain because each antenna combines data streams that have undergone different Rayleigh fading. However, when an antenna transmits and receives a plurality of different data streams based on beamforming and optimum combining technology, interference may be added to the combination of the different data streams, which leads to performance deterioration. Therefore, conventional MIMO antenna systems employing beamforming and optimum combining technology are designed on the assumption that the same data streams are received. The conventional MIMO antenna systems may increase transmission liability but it does not reach a transmission rates required for high-speed wireless communication. In short, the conventional MIMO antenna systems have a problem in that they cannot acquire multiplexing gain.

Figure 1:
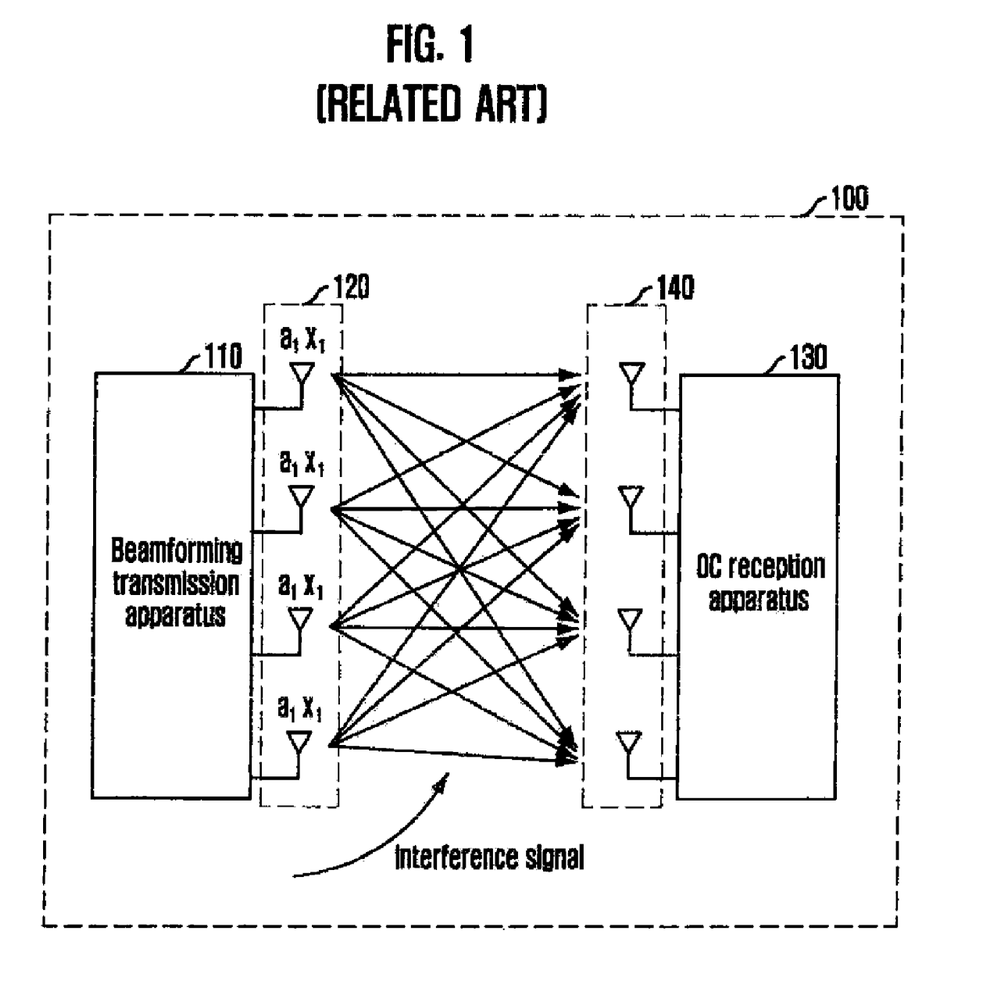
FIG. 1 illustrates a typical antenna system based on Multiple Input Multiple Output (MIMO) Optimum Combining (MIMO-OC) technology.

FIG. 1 illustrates a typical antenna system based on MIMO Optimum Combining (MIMO-OC) technology. The drawing shows a 4×4 MIMO antenna system 100 including a transmission apparatus 100 and a reception apparatus, each having four antennas 120 and 140.

The transmission apparatus 110 simultaneously transmits a plurality of data streams $(a_1 x_1)$ through beamforming. Herein, the data streams $(a_1 x_1)$ are all the same. Since a plurality of data streams pass through diverse channel paths, diversity gains are acquired as much as a multiplication of the numbers of transmission and reception antennas. Therefore, the antenna system 100 of FIG. 1 can acquire 4×4 antenna gains.

The reception apparatus 130 receives a plurality of data streams $(a_1 x_1)$ through multiple reception antennas 140. As described before, when a plurality of bit streams are transmitted through multiple transmission antennas 120, data stream received by each antenna acts as interference onto data streams received by the other antennas. Therefore, the reception antenna 140 removes cochannel interference by using optimum combining onto the data streams received by the multiple antennas.

However, when a plurality of different data steams $(a_1 x_1, a_2 x_2, a_3 x_3$ and $a_4 x_4)$ are transmitted through each of the transmission antennas, both cochannel interference and interference between bit streams occur at the same time. Thus, the reception apparatus 130 cannot combine the different data streams. When this problem arises, conventional technology acquires diversity gain by increasing the number of transmission antennas 120 to thereby improve liability. However, when a plurality of different bit streams are transmitted simultaneously, it cannot performing the combining and thus it cannot acquire multiplexing gain.

As a solution to this problem, Vertical Bell Lab Space Time (V-BLAST) technology independently transmits data streams from multiple transmission antennas to reach a channel capacity of an MIMO antenna system, which is a data transmission rate required for high-speed wireless communication. V-BLAST is a less complex version of existing Diagonal Bell Lab Space Time (D-BLAST) structure. The V-BLAST technology simply demultiplexes serial data streams to be transmitted into parallel data streams according to the number of antennas of the transmission apparatus. The parallel data streams are simultaneously transmitted through the transmission antennas, respectively, to thereby increase the channel capacity.

Also, when both transmission apparatus and reception apparatus are aware of channel information, a waterfilling allocation method of a power based on singular value decomposition (SVD) may be used. With singular value decomposition, a channel matrix may be decomposed into two unitary matrixes and a diagonal matrix having its eigenvalue in a diagonal term. A channel comes to have a diagonal form without interference between streams when the unitary matrixes obtained from the decomposition are multiplied by the channel information of the reception and transmission apparatuses. Also, when an inverse number of the eigenvalue the diagonal term, which can be regarded as a gain of each channel, is allocated as a transmission power, the MIMO antenna system can reach the desired channel capacity.

The conventional technology increases channel capacity and acquires multiplexing gain by raising a data transmission rate in such a manner that different data streams that are independent from each other are transmitted through the antennas of the transmission apparatus. However, the conventional technology has a shortcoming that cochannel interference cannot be removed. In other words, the conventional technology cannot acquire diversity gain. Removal of cochannel interference requires a combining structure in the reception apparatus. However, the singular value decomposition technology and the V-BLAST technology described before cannot use the combining technology because they transmit independent data streams from all transmission antennas. After all, all the antennas of the reception apparatus are used to remove the interference between the independent data streams, the convention technologies cannot prevent performance deterioration cause by cochannel interference.

Therefore, it is required to develop an MIMO antenna system that can secure high data transmission rates while minimizing the influence of cochannel interference in a multi-cell environment.

SUMMARY OF THE INVENTION

An embodiment of the present invention is directed to providing a reception apparatus and method of a Multiple Input Multiple Output (MIMO) antenna system that can secure high data transmission rate while minimizing influence of cochannel interference based on QR decomposition, beamforming, and optimal combining technology to thereby produce a maximal output signal-to-interference-plus-noise ratio (SINR).

In accordance with an aspect of the present invention, there is provided a reception apparatus for receiving a plurality of different data streams in an MIMO antenna system, which includes: a data stream detector for detecting each data stream by removing interference between the different data streams while maintaining channel information; and a cochannel interference (CCI) remover for removing cochannel interference from each data stream detected in the data stream detector.

In accordance with an aspect of the present invention, there is provided a method for receiving a plurality of different data streams in a reception apparatus of an MIMO antenna system, which includes: detecting each data stream by removing interference between the different data streams while maintaining channel information; and removing cochannel interference from each detected data stream.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Also, when it is considered that detailed description on a related art may obscure a point of the present invention, the description will not be provided herein. Hereinafter, specific embodiments of the present invention will be described with reference to the accompanying drawings.

The present invention provides a reception apparatus and method of a Multiple Input Multiple Output. (MIMO) antenna system that receives a plurality of different data streams transmitted from a transmission apparatus with multiple antennas through multiple reception antennas The words "a plurality of different data streams" refer to data streams independent from each other, and they are simultaneously transmitted through multiple antennas set up in the transmission apparatus. Each of the transmission apparatus and the reception apparatus has multiple antennas, and the number of antennas of the transmission apparatus does not have to be the same as the number of antennas of the reception apparatus. The word "diversity" signifies transmitting identical data streams simultaneously and complementing data streams that have passed through diverse channel paths with each other to thereby improve signal reception performance. The word "multiplexing" signifies transmitting a plurality of different data streams to thereby increase data transmission rate. Conventional technology referred to in the present patent specification signifies MIMO-Optimum-Combining (MIMO-OC), in which identical data streams are transmitted through multiple antennas of the transmission apparatus and the reception apparatus receives the transmitted data streams and detects bit streams based on optimum combining.

Figure 2:
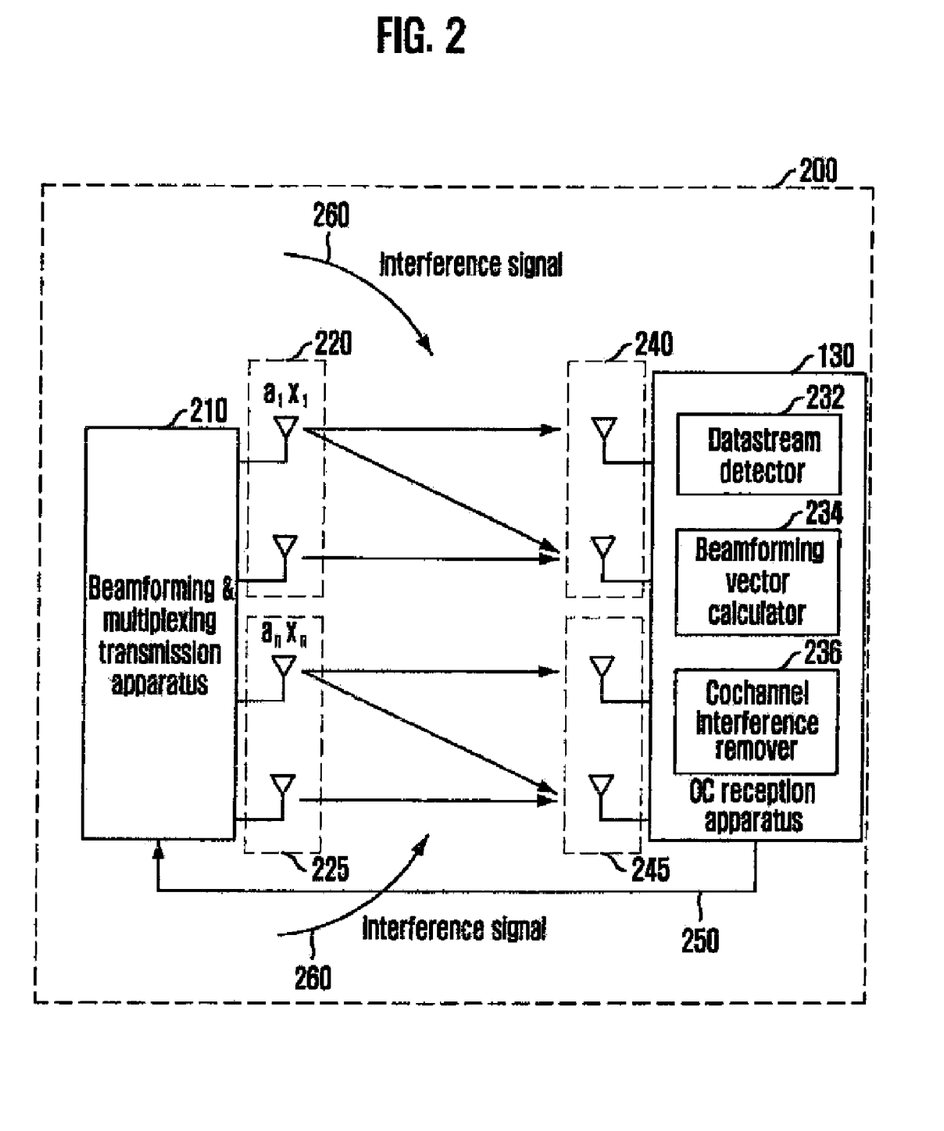
FIG. 2 is a block view of an MIMO antenna system to which the present invention is applied.

FIG. 2 is a block view of an MIMO antenna system to which the present invention is applied. As shown in the drawing, the MIMO antenna system 200 includes a transmission apparatus 210 and a reception apparatus 230. There is a feedback channel 250 from the reception apparatus 230 toward the transmission apparatus 210, and an interference signal 260 gets involved.

The transmission apparatus 210 includes multiple antennas, which are grouped according to the number of data streams to be transmitted. For example, when two data streams are to be transmitted through four transmission antennas 220 and 225, the transmission antennas 220 and 225 are divided into two groups according to the number of the data streams: A first antenna group 220 and a second antenna group 225. The first antenna group 220 transmits first bitstream ($a_1 x_1$) and the second antenna group 225 transmits second bitstream ($a_2 x_2$). Herein, the bit stream transmission is executed based on beamforming, and a beamforming vector is fed back from the reception apparatus 230.

The reception apparatus 230 includes a data stream detector 232, a beamforming vector calculator 234, and a cochannel interference (CCI) remover 236.

The data stream detector 23 2 removes interference between multiple data streams received through multiple reception antennas 240 and 245 and detects data streams while maintaining channel information. The data streams (y) received through the multiple reception antennas 240 and 245 may be represented as the following Equation 1.

$$y = Hs + \sum_{k=1}^{K} h_k z_k + n$$

$$= [H_1 H_2 \Lambda H_n] \begin{bmatrix} a_1 x_1 \\ a_2 x_2 \\ M \\ a_n x_n \end{bmatrix} + \sum_{k=1}^{K} h_k z_k + n$$

$$= \sum_{i=1}^{n} H_i a_i x_i + \sum_{k=1}^{K} h_k z_k + n$$

Eq. 1 where H denotes a channel, which is an $N_r \times N_t$ matrix formed of complex Gaussian random variables, where $N_r$ denotes the number of reception antennas and $N_t$ denotes the number of transmission antennas;

n denotes $n_R \times 1$ white Gaussian noise;

$z_k$ denotes an interference signal caused by an adjacent cell;

$h_k$ denotes an interference channel;

$H_i$ denotes a subchannel of a channel (H), the subchannel being an $N_r \times N_i$ matrix, where $N_i$ denotes the number of interference signals;

s denotes a signal $a_n x_n$ to be transmitted; and $a_n$ denotes a beamforming vector of a transmission antenna.

According to the present invention, the interference between a plurality of data streams may be removed through QR decomposition. Channel information (H) can be represented as a channel of a QR matrix through the QR decomposition shown in Equation 2 below. QR decomposition of the channel information (H) outputs Q matrix, which is a unitary matrix, and an upper-triangular matrix (R) where the lower triangle is 0. Herein, the Q matrix shown in the following Equation 3 has a characteristic of a unitary matrix. Thus, when an inverse matrix ($Q^H$) of the Q matrix is multiplied to both sides, an upper-triangular matrix (R) shown in the following Equation 4 can be acquired. When the acquired upper-triangular matrix (R) is substituted into a received signal (y), the result is represented as Equation 5, where x denotes a signal to be transmitted. A plurality of data streams transmitted though the process may be regarded to have passed through the R matrix. Since the unitary matrix Q is multiplied at this time, the characteristics of the channel do not change. In other words, the channel information is maintained.

$$H = QR \qquad \text{Eq. 2}$$

$$Q^H Q = I \qquad \text{Eq. 3}$$

$$R = \begin{bmatrix} r_{1,1} & r_{1,2} & \Lambda & r_1, N_t \\ 0 & r_{2,2} & \Lambda & r_2, N_t \\ M & & & \\ 0 & \Lambda & rN_t-1, N_t-1 & rN_t-1, N_t \\ 0 & \Lambda & 0 & rN_t, N_t \end{bmatrix} \qquad \text{Eq. 4}$$

$$\tilde{y} = Q^H y = Rx + \sum_{k=1}^{K} \tilde{h}_k z_k + \tilde{n} \qquad \text{Eq. 5}$$

Since the R matrix represented in the Equation 4 is an upper-triangular matrix, a group of data streams among the multiple data streams that have passed through the R matrix is deprived of interference between the data streams. To be specific, all columns of the $t^{th}$ and $(t-1)^{th}$ rows are 0 except for the $t^{th}$ and $(t-1)^{th}$ columns. This signifies that the data streams transmitted through the last two columns are received by only two reception antennas. In other words, this signifies that the signals inputted through the reception antennas corresponding to the last two columns do not have interference between data streams.

For example, when two different data streams are transmitted through two antenna groups, each antenna group including two antennas, the result can be represented as Equation 6 below. Herein, R1, R2 and R3 are represented as Equation 7.

$$\tilde{y} = \begin{bmatrix} \tilde{y}_1 \\ \tilde{y}_2 \end{bmatrix} = \begin{bmatrix} R_1 & R_3 \\ 0 & R_2 \end{bmatrix} \begin{bmatrix} a_1 x_1 \\ a_2 x_2 \end{bmatrix} + \sum_{k=1}^{K} \begin{bmatrix} \tilde{h}_{1,k} \\ \tilde{h}_{2,k} \end{bmatrix} z_k + \begin{bmatrix} \tilde{n}_1 \\ \tilde{n}_2 \end{bmatrix} = \qquad \text{Eq. 6}$$

$$\begin{bmatrix} R_1 a_1 x_1 + R_3 a_2 x_2 + \sum_{k=1}^{K} \tilde{h}_1, kzk + \tilde{n}_1 \\ R_2 a_2 x_2 + \sum_{k=1}^{K} \tilde{h}_2, kzk + \tilde{n}_2 \end{bmatrix}$$

$$R_1 = \begin{bmatrix} r_{1,1} & r_{1,2} \\ 0 & r_{2,2} \end{bmatrix} \qquad \text{Eq. 7}$$

$$R_2 = \begin{bmatrix} r_{3,3} & r_{3,4} \\ 0 & r_{4,4} \end{bmatrix}$$

$$R_3 = \begin{bmatrix} r_{1,3} & r_{1,4} \\ r_{2,3} & r_{2,4} \end{bmatrix}$$

$$0 = \begin{bmatrix} 0 & 0 \\ 0 & 0 \end{bmatrix}$$

The second data stream transmitted from the lowermost transmission antenna group 225 is detected first, and then the first data stream transmitted from the next transmission antenna group 220 can be detected by eliminating the second data stream estimated in the first data stream. Interference can be removed sequentially by repeating the process. All data streams may be assumed that they are transmitted independently without interference between data streams. Since the interference between data streams disappears, each data stream can be detected easily.

Differently from the conventional system shown in FIG. 1 where a plurality of data streams interfere each other, A system 200 of the present invention has two independent channels as shown in FIG. 2 through QR decomposition. When each antenna group has an independent channel through QR decomposition and/or sequential interference elimination, it can be regarded that each data stream is received through a different channel. Therefore, channel information of each data stream can be maintained. With the channel information, a beamforming vector and an optimum combining (OC) vector that maximize the signal-to-interference-plus-noise ratio of each reception antenna group can be acquired.

Also, according to the present invention, the interference between data streams can be removed through sorted QR decomposition (SQRD). Data streams can be also identified using QR decomposition, individually, whiling maintaining their channel informations. When the QR decomposition method is used, data streams detected later are likely to have higher signal-to-interference-plus-noise ratio than those detected earlier.

This phenomenon is originated from partial use of R matrix during the QR decomposition. According to the QR decomposition, the data stream detected first, which is data stream of the $t^{th}$ row, is transmitted from one transmission antenna group 225 and received by one reception antenna group 245. In other words, signals received by the other reception antenna group 240 are just wasteful. On the contrary, data stream detected secondly, which is data stream of a $(t-1)^{th}$ row, is transmitted from two transmission antenna groups 220 and 225 and detected using signals received by two reception antenna groups 240 and 245. Therefore, the signal-to-interference-plus-noise ratio of the data stream detected secondly becomes higher than the data stream detected first with some loss. The sequential interference elimination is repeatedly executed until every transmitted data stream is detected. Therefore, as the number of transmitted data stream increases, the difference between the SINR of the data stream detected first and the SINR of the data stream detected last becomes larger.

Sorted QR Decomposition (SQRD) technology can solve this problem. Since SQRD technology processes rows with least norms during the QR decomposition, large values are positioned in the lowest row. A signal-to-interference-plus-noise ratio is decided based on an eigenvalue of a partial channel matrix. The greater the value of a diagonal term of the matrix is, the higher value the eigenvalue of the matrix may have. Therefore, when the SQRD technology is used, it is possible to position great values in the lower rows of an R matrix while maintaining channel information. Since the calculated eigenvalue becomes large, the signal-to-interference-plus-noise ratio grows high as well.

Therefore, although data streams detected early cannot be detected using all reception antennas, the power loss can be compensated for through high signal-to-interference-plus-noise ratio. Since this process increases the signal-to-interference-plus-noise ratio of a symbol detected first, the method of the present invention employing the SQRD technology to detect data streams can make the data streams have almost same signal-to-interference-plus-noise ratio regardless of the detection sequence.

It is obvious to those skilled in the art of the present invention that the process of applying the QR decomposition or the SQR decomposition is not more than a mere embodiment and the QR decomposition or the SQR decomposition may be performed through diverse algorithms.

The beamforming vector calculator 234 calculates a beamforming vector based on channel information of each data stream detected in the data stream detector 232, and feeds back the beamforming vector to the transmission apparatus 210. The beamforming vector is acquired from the following Equations 8 and 9.

$$v(A_i) \triangleq \text{the } eigenvecto\ r \text{ of the matrix } A_i \quad \text{Eq. 8}$$

which correspond $s$ to the largest $eigenvalue$, $$A_i \triangleq R_i^H \Phi_i^{-1} R_i,$$

$$\Phi_i \triangleq \sum_{k=1}^{K} \sigma_z^2 h_{i,k}^H + \sigma_n^2 I_{N_t}$$

where $R_i$ denotes a channel for each antenna group, which is a partial matrix of an existing R matrix;
$h_{i,k}$ denotes a channel of an interference signal;
i denotes an identification number of a group;
K denotes the number of interference signals;
$\sigma_z^2$ denotes the strength of an interference signal; and
$\sigma_n^2$ denotes the strength of noise.

$$a_i = v(A_i),$$

$$b_i = \mu \Phi_i^{-1}(H_i a_i) \quad \text{Eq. 9}$$

where $a_i$ denotes a beamforming vector.

The beamforming vector $a_i$ is an eigenvector making an eigenvalue largest among eigenvectors of $A_i$ matrix. Since the acquired beamforming vector maximizes the signal-to-interference-plus-noise ratio of each reception antenna group, the signal-to-interference-plus-noise ratio of the entire reception antennas becomes the maximum. The acquired beamforming vector is fed back to the transmission apparatus 210 through a feedback channel 250. The calculation of a beamforming vector described in the present specification is not more than mere embodiment and it is obvious to those skilled in the art to which the present invention pertains that the beamforming vector may be acquired through diverse methods.

The cochannel interference remover 236 eliminates cochannel interference from the data streams detected in the data stream detector 232. Particularly, cochannel interference can be removed by performing optimal combining. According to the present invention, since data streams are individually detected through QR decomposition, channel information is maintained. Therefore, it is possible to use an OC vector (which is a weight vector) to perform the optimum combining based on the channel information. The OC vector is acquired based on the following Equation 9. The OC vector $b_i$ is acquired by multiplying a beamforming vector (a) by a channel (H) and multiplying an inverse matrix of $\Phi_i$. The OC vector calculation method described in the present specification is not more than a mere embodiment and it is obvious to those skilled in the art of the present invention that diverse methods can be applied to calculate the OC vector.

Conventional technologies cannot acquire diverse and multiplexing gain simultaneously, because they could not remove cochannel interference when different data streams are received. Particularly, channel information is required to use the optimum combining technology to remove cochannel interference, but the conventional technologies lose the channel information in the middle of multiplexing. Differently from the conventional technology, the MIMO antenna system 200 of the present invention can keep the channel information by segmenting each data stream based on QR decomposition or sorted QR decomposition With the channel information, the transmission apparatus can perform beamforming and the reception apparatus can perform optimum combining.

Figure 3:
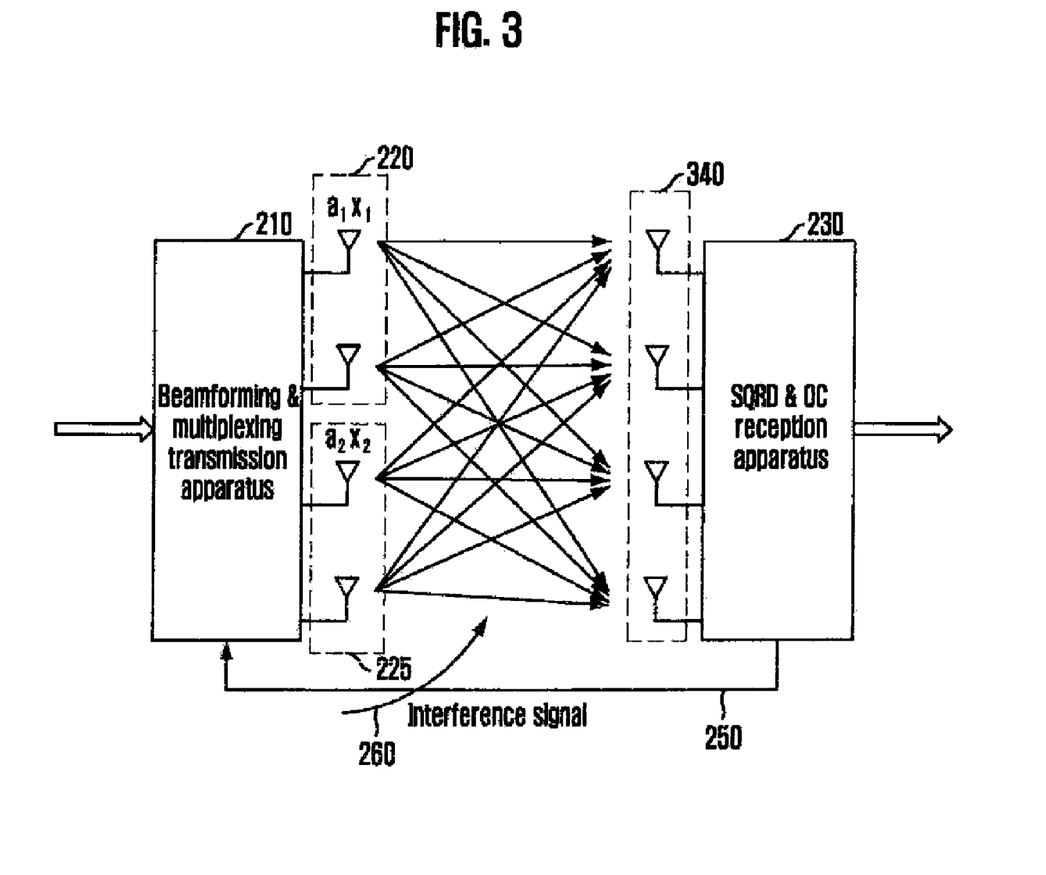
FIG. 3 is a block view showing how a plurality of different data streams are received in an MIMO antenna reception apparatus in accordance with an embodiment of the present invention.
Figure 4:
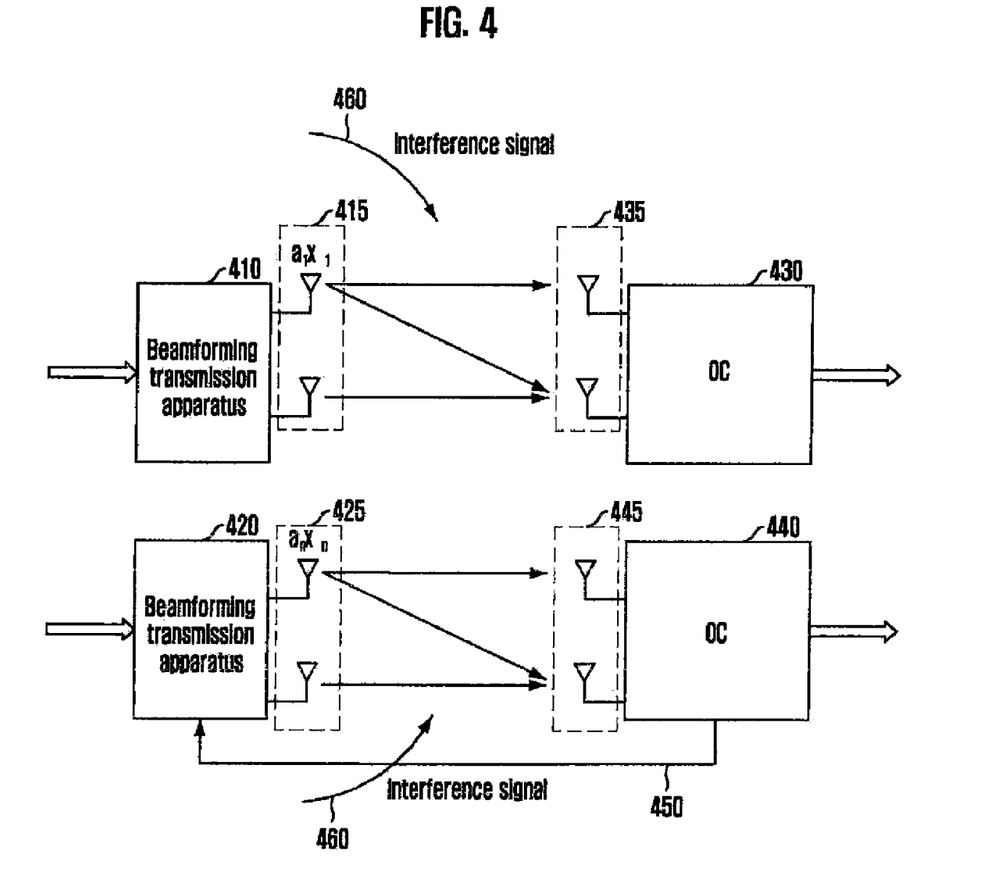
FIG. 4 illustrates different data streams forming independent channel after interference among the data streams is removed in accordance with an embodiment of the present invention.

FIGS. 3 and 4 illustrate how an independent channel is formed in the MIMO antenna system in accordance with an embodiment of the present invention. FIG. 3 is a block view showing how a plurality of different data streams are received in an MIMO antenna reception apparatus in accordance with an embodiment of the present invention. FIG. 4 illustrates different data streams forming independent channel after interference among the data streams is removed in accordance with an embodiment of the present invention.

Referring to FIG. 3, the transmission apparatus 210 groups transmission antennas into two antenna groups 220 and 225 in order to transmit two data streams ($a_1x_1$ and $a_2x_2$). When the two data streams are transmitted, they are received by a plurality of antenna groups 340 of the reception apparatus 230. The reception apparatus 230 removes interference between the data streams from each data stream that has received. The removal of interference caused between the data streams may be performed based on QR decomposition or sorted QR decomposition.

Referring to FIG. 4, which illustrates different data streams forming independent channel after interference among the data streams is removed in accordance with an embodiment of the present invention, each antenna group comes to have an independent channel in the process of detecting each data stream by removing the interference between the data streams based on QR decomposition and sorted QR decomposition. For example, a first transmission antenna group 415 transmits a first bit stream ($a_1x_1$), which is received by a first reception antenna group 435 through an independent channel. A second transmission antenna group 425 transmits a second bit stream ($a_2x_2$), which is received by a second reception antenna group 445 through an independent channel. Channel information of each independent channel is kept even after the interference between bit streams is removed. Therefore, a beamforming vector value acquired based on the channel information can be fed back to the transmission apparatuses 410 and 420. Also, since the bit streams are received through independent channels, the reception apparatuses 430 and 400 removes cochannel interference by executing optimal combining. Through the process described above, the MIMO antenna system of the present invention can acquire both diversity and multiplexing gains.

Figure 5:
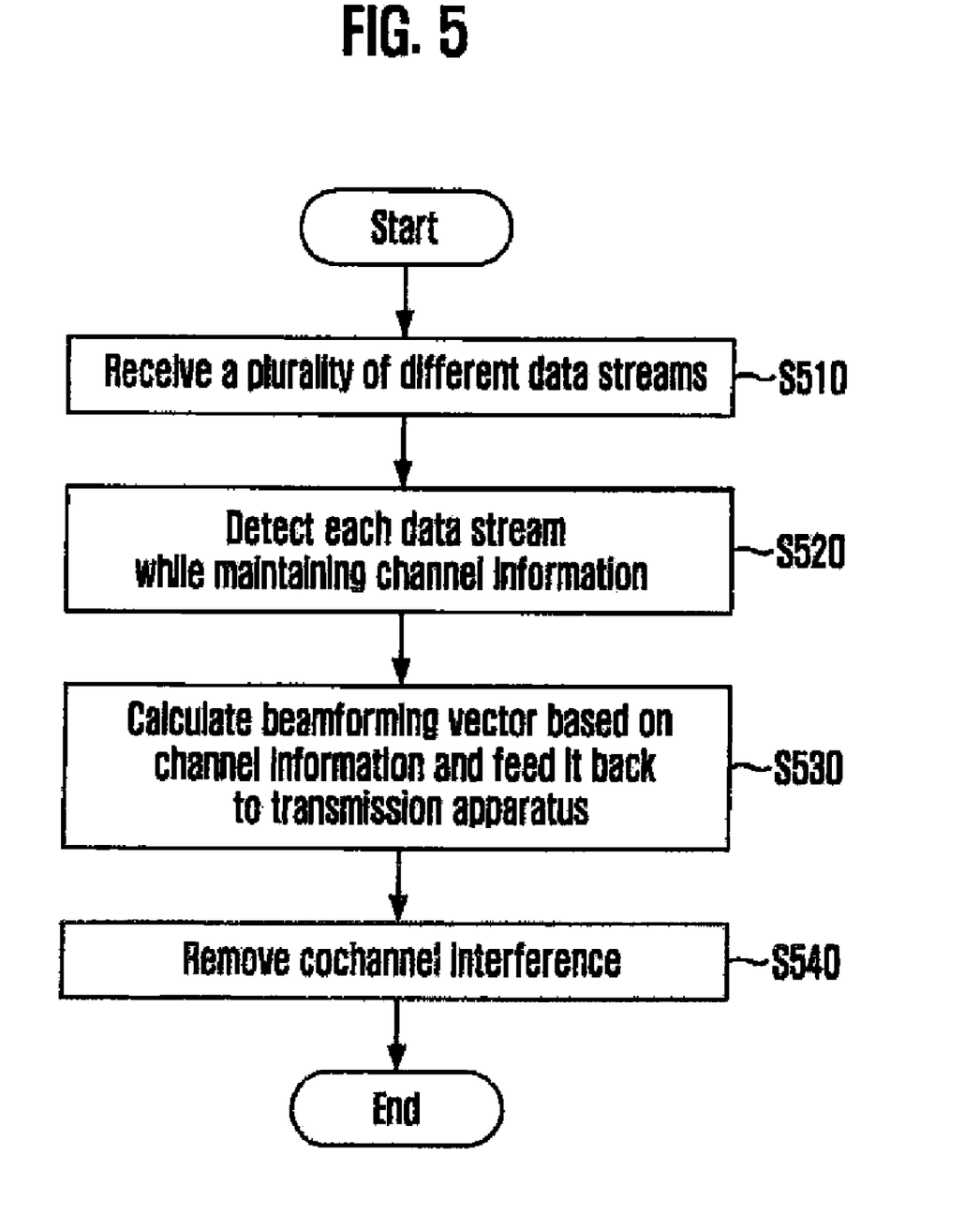
FIG. 5 is a flowchart describing a process of receiving a plurality of different data streams to which the present invention is applied.

FIG. 5 is a flowchart describing a process of receiving a plurality of different data streams to which the present invention is applied.

In step S510, a plurality of different data streams are transmitted from a transmission apparatus 210 including multiple antennas 220 and 225 and received by multiple antennas 240 and 245 of a reception apparatus.

In step S520, a data stream detector 232 of the reception apparatus 230 removes interference between data streams and detects each data stream. The interference between data streams can be removed through QR decomposition or sorted QR decomposition. Each data stream is detected with its channel information maintained.

In step S530, the beamforming vector calculator 234 of the reception apparatus 230 calculates a beamforming vector based on the channel information, and the acquired beamforming vector is fed back to the transmission apparatus 210.

The transmission apparatus 210 transmits a plurality of data streams based on the fed-back beamforming vector.

In step S540, a cochannel interference remover 236 of the reception apparatus removes cochannel interference from each data stream detected in the data stream detector 232. An OC vector is used herein, and the OC vector is calculated and acquired based on the channel information. Through the above process, the MIMO antenna system 200 of the present invention overcomes the limit of a conventional MIMO antenna system that is designed to process only one data stream and the limit in multiplexing whose performance is deteriorated by cochannel interference to thereby acquire both diversity gain and multiplexing gain.

Figure 6:
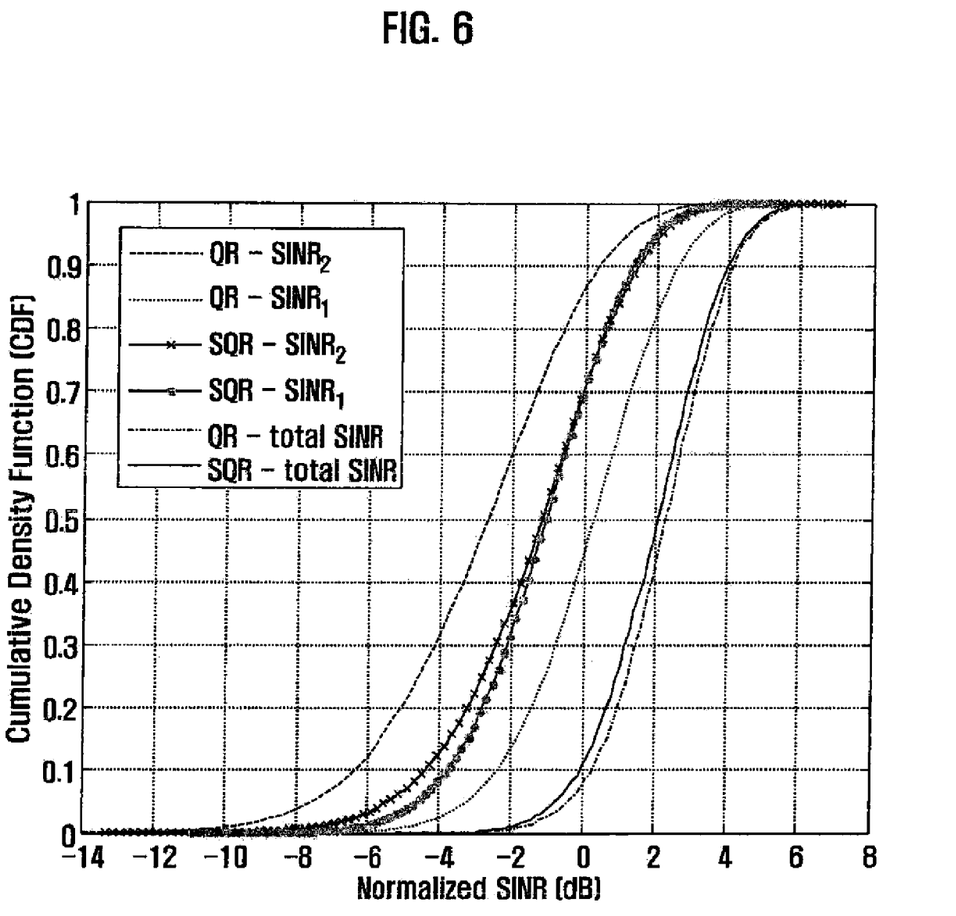
FIG. 6 is a graph showing a Signal-to-interference plus Noise Ratio (SINR) distribution difference between QR Decomposition (QRD) and Sorted QRD (SQRD) in accordance with an embodiment of the present invention.

FIG. 6 is a graph showing a SINR distribution difference between QR decomposition and sorted QR decomposition in accordance with an embodiment of the present invention.

When the transmission apparatus transmits two different data streams, the data stream detector of the reception apparatus removes the interference between the two data streams and detects each data stream. Herein, the signal-to-interference-plus-noise ratio of each data stream can be measured.

The signal-to-interference-plus-noise ratio of a case when interference between data streams is removed through QR decomposition is marked with 'QR-SINR1 QR-SINR2'; and the signal-to-interference-plus-noise ratio of a case when interference between data streams is removed through sorted QR decomposition is marked with 'SQR-SINR1 SQR-SINR2'. Also, an average signal-to-interference-plus-noise ratio of two signals based on QR decomposition is marked with 'QR-total SINR' and an average signal-to-interference-plus-noise ratio of two signals based on sorted QR decomposition is marked with 'SQR-total SINR'.

When the interference between data streams is removed through QR decomposition, it can be seen from the graph that the SINR of data streams detected early is lower than the SINR of the data streams detected later. When the interference between data streams is removed through sorted QR decomposition, it can be seen from the graph that the SINR of data streams detected early has a distribution almost the same as the SINR of the data streams detected later.

Figure 7:
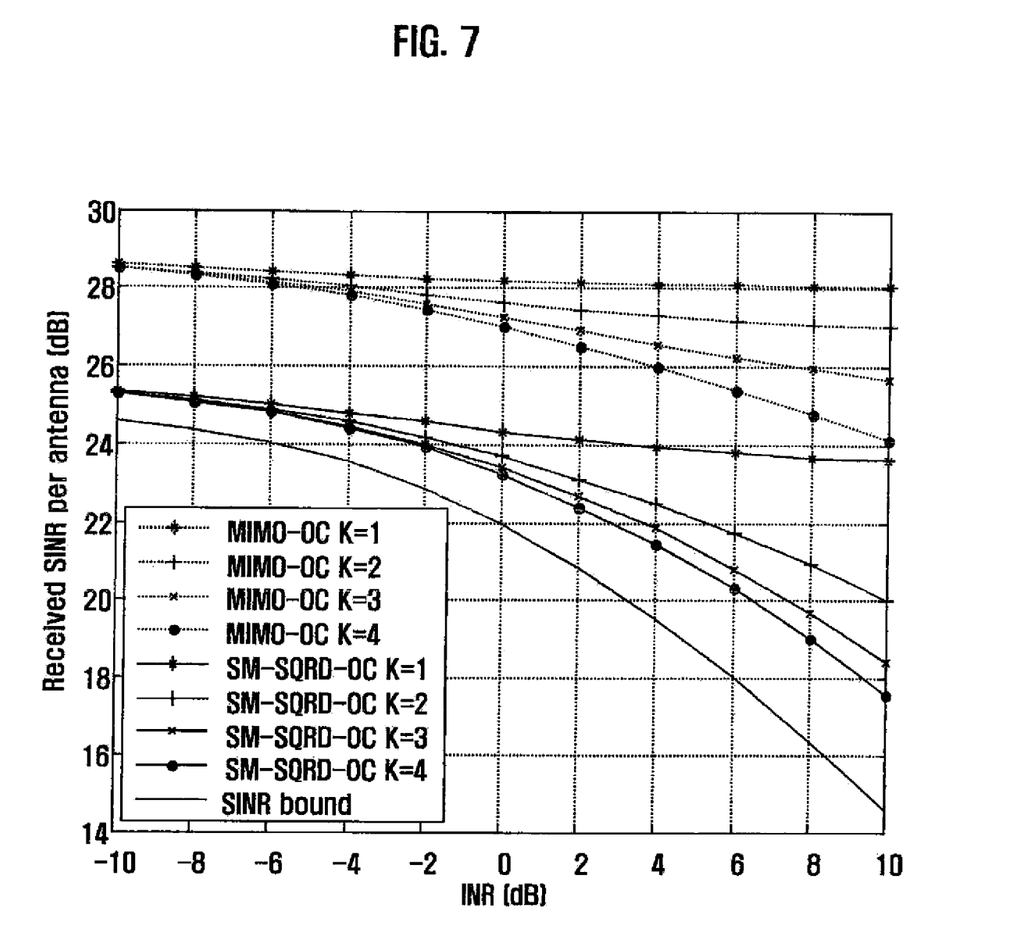
FIG. 7 is a graph showing a variation of signal-to-interference-plus-noise ratio according to an Interference-to-Noise Ratio (INR) of a conventional MIMO Optimum Combining (MIMO-OC) system and a Spatial Multiplexing Sorted QR-Decomposition Optimum (SM-SQRD-OC) system suggested in accordance with an embodiment of the present invention.

FIG. 7 is a graph showing a variation of signal-to-interference-plus-noise ratio according to an Interference-to-Noise Ratio (INR) of a conventional MIMO Optimum Combining (MIMO-OC) system and a Spatial Multiplexing Sorted QR-Decomposition Optimum (SM-SQRD-OC) MIMO antenna system suggested in accordance with an embodiment of the present invention. The graph of FIG. 7 shows that the SM-SQRD-OC MIMO antenna system of the present invention has superior performance in error rate to that of the conventional MIMO-OC antenna system, when the same amount of data are transmitted.

This is because the modulation size used in the conventional antenna system is different from the modulation size used in the present invention, when the same amount of data streams are transmitted. For example, when 8-bit data streams are transmitted using four transmission antennas, the conventional MIMO-OC antenna system uses 256 QAM. However, since the MIMO antenna system of the present invention can use 16 QAM, which is superior to 256 QAM, it can have a lower bit error rate (BER).

Figure 8:
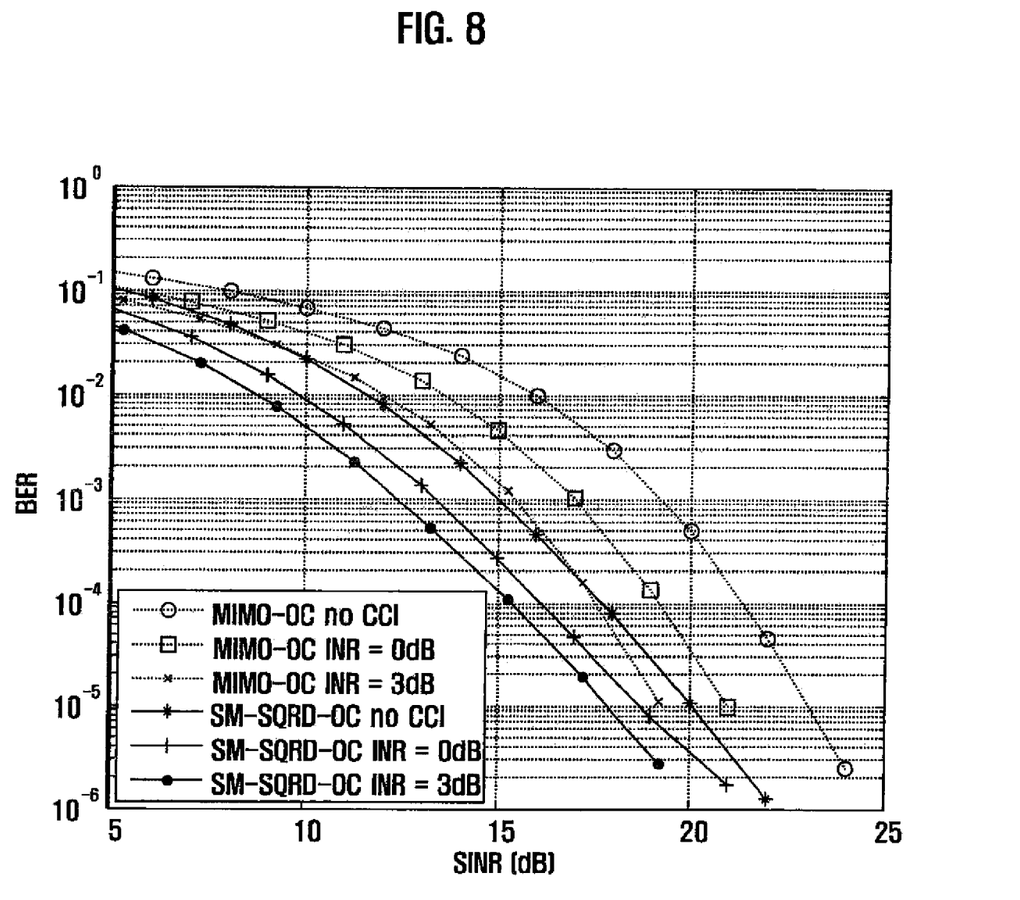
FIG. 8 is a graph comparing a bit error rate of a conventional MIMO-OC system with that of an MIMO reception apparatus of the present invention based on the intensity of an interference signal, when there is one interference signal.
Figure 9:
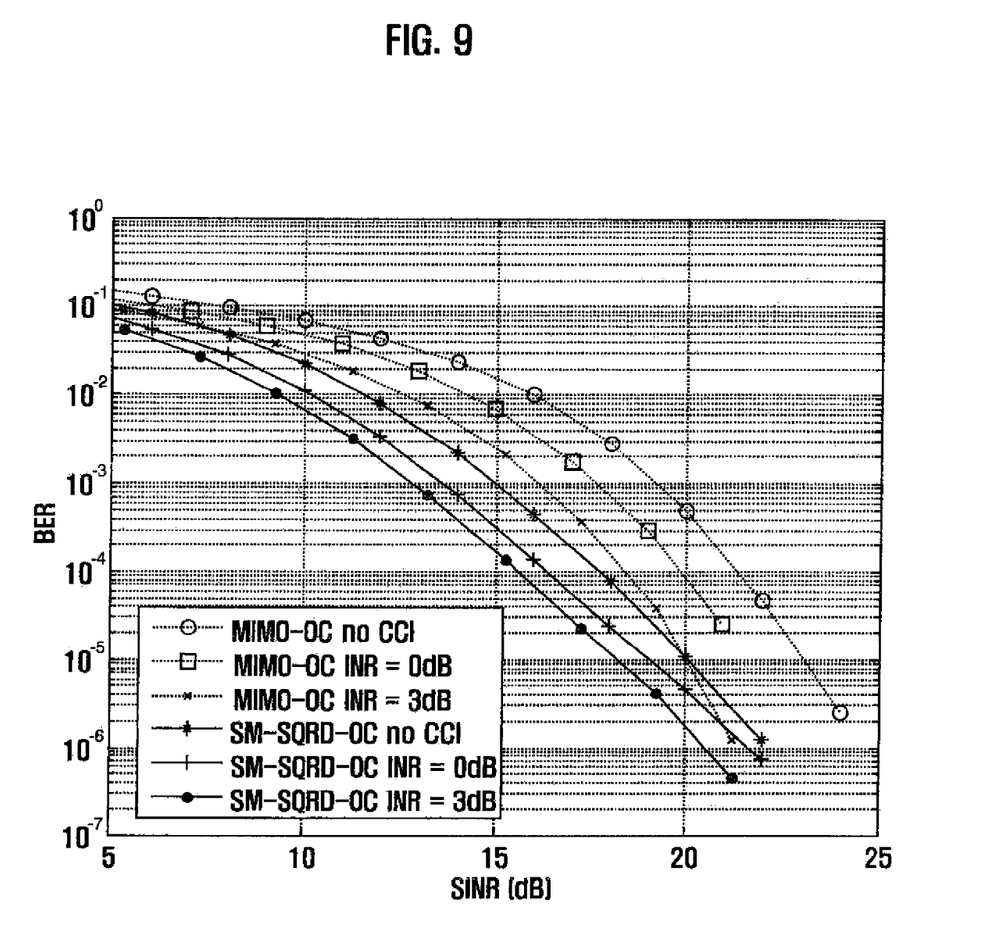
FIG. 9 is a graph comparing a bit error rate of a conventional MIMO-OC system with that of an MIMO reception apparatus of the present invention based on the intensity of an interference signal, when there are two interference signals.

FIGS. 8 and 9 show graphs bit error rates (BER) of the conventional MIMO-OC antenna system and the MIMO antenna system of the present invention according to the strength of an interference signal. With the graphs of FIGS. 8 and 9, it is possible to compare performance deterioration caused by an interference signal between the conventional MIMO-OC antenna system and the MIMO antenna system of the present invention.

FIG. 8 is a graph comparing a bit error rate of a conventional MIMO-OC system with that of an MIMO reception apparatus of the present invention based on the intensity of an interference signal, when there is one interference signal.

FIG. 9 is a graph comparing a bit error rate of a conventional MIMO-OC system with that of an MIMO reception apparatus of the present invention based on the intensity of an interference signal, when there are two interference signals. Both FIGS. 8 and 9 show that the MIMO antenna system of the present invention has a lower bit error rate and that the MIMO antenna system of the present invention presents superior performance than when the strength of the interference signal(s) becomes stronger or the number of interference signals increases.

The present invention discloses a reception apparatus and method that can simultaneously remove cochannel interference and transmit a plurality of different signals in an MIMO antenna system. According to the technology of the present invention, a plurality of different data streams received through multiple antennas are separated while channel information is maintained by removing interference between the data streams, and a beamforming vector can be calculated based on the channel information and fed back to the transmission apparatus. The transmission apparatus receives the beamforming vector and transmits a plurality of different data streams based on the beamforming vector. The reception apparatus performs optimal combining to remove cochannel interference. Therefore, the present invention can remove cochannel interference and increase channel capacity to thereby acquire both diversity gain and multiplexing gain.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

While the present invention has been described with respect to the specific embodiments, it will be apparent to those skilled in the art that various changes and modifications may be made without departing from the spirit and scope of the invention as defined in the following claims.

What is claimed is:

1. A reception apparatus for receiving a plurality of different data streams in a multiple input multiple output (MIMO) antenna system, comprising:
   a data stream detector for detecting each data stream by removing interference between the different data streams while maintaining channel information; and
   a cochannel interference (CCI) remover for removing cochannel interference from each data stream detected in the data stream detector;
   wherein the plurality of different data streams are transmitted from transmission antennas divided into antenna groups;
   wherein the data stream detector detects a first data stream transmitted from a lowermost antenna group among the antenna groups, then detects a second data stream transmitted from a next antenna group of the lowermost antenna group, by eliminating the first data stream in the second data stream;
   wherein each data stream is received through an independent channel which is formed between each antenna group and the reception apparatus;
   wherein each data stream is transmitted from a corresponding one of the antenna groups through a corresponding independent channel.

2. The reception apparatus of claim 1, further comprising:
   a beamforming vector calculator for calculating a beamforming vector based on the channel information of each data stream detected in the data stream detector and feeding back the beamforming vector to a transmission apparatus.

3. The reception apparatus of claim 1, wherein the data stream detector detects each data stream by removing interference between the data streams through QR decomposition.

4. The reception apparatus of claim 3, wherein the QR decomposition detects each data stream sequentially by detecting data streams of an $n^{th}$ row, which do not have interference between the data streams, through an n×n R matrix channel, which is an upper triangular matrix, and removing the data streams of the $n^{th}$ row from data streams of an $(n-1)^{th}$ row, where n denotes the number of antennas.

5. The reception apparatus of claim 1, wherein the data stream detector detects each data stream by removing the interference between the data streams through sorted QR decomposition.

6. The reception apparatus of claim 5, wherein the sorted QR decomposition detects each data stream sequentially by detecting data streams of an $n^{th}$ row, which do not have interference between the data streams, through an n×n R matrix channel, which is an upper triangular matrix, and removing the data streams of the $n^{th}$ row from data streams of an $(n-1)^{th}$ row, where n denotes the number of antennas.

7. The reception apparatus of claim 1, wherein the cochannel interference remover removes cochannel interference through optimum combining.

8. A method for receiving a plurality of different data streams in a reception apparatus of a multiple input multiple output (MIMO) antenna system, comprising:
   detecting each data stream by removing interference between the different data streams while maintaining channel information; and
   removing cochannel interference from each detected data stream;
   wherein the plurality of different data streams are transmitted from transmission antennas divided into antenna groups;
   wherein said detecting each data stream includes detecting a first data stream transmitted from a lowermost antenna group among the antenna groups, then detecting a second data stream transmitted from a next antenna group of the lowermost antenna group, by eliminating the first data stream in the second data stream;
   wherein each data stream is received through an independent channel which is formed between each antenna group and the reception apparatus;
   wherein each data stream is transmitted from a corresponding one of the antenna groups through a corresponding independent channel.

9. The reception method of claim 8, further comprising:
   calculating a beamforming vector based on the channel information of each detected data stream and feeding back the beamforming vector to a transmission apparatus.

10. The reception method of claim 8, wherein in said detecting each data stream, each data stream is detected by removing interference between the different data streams through QR decomposition.

11. The reception method of claim 10, wherein in said detecting each data stream, each data stream is detected sequentially by:
 detecting data streams of an $n^{th}$ row, which do not have interference between the data streams, through an n×n R matrix channel, which is an upper triangular matrix; and
 removing the data streams of the $n^{th}$ row from data streams of an $(n-1)^{th}$ row, where n denotes the number of antennas.

12. The reception method of claim 8, wherein in said detecting each data stream,
 each data stream is detected by removing the interference between the data streams through sorted QR decomposition.

13. The reception method of claim 12, wherein in said detecting each data stream, each data stream is detected sequentially by:
 detecting data streams of an $n^{th}$ row, which do not have interference between the data streams, through an n×n R matrix channel, which is an upper triangular matrix; and
 removing the data streams of the $n^{th}$ row from data streams of an $(n-1)^{th}$ row, where n denotes the number of antennas.

14. The reception method of claim 8, wherein in said removing cochannel interference from each detected data stream,
 cochannel interference is removed through optimum combining.

* * * * *